United States Patent [19]

Seiberling

[11] Patent Number: 4,756,782
[45] Date of Patent: Jul. 12, 1988

[54] METHOD FOR RETREADING TIRES

[76] Inventor: Theophilus K. Seiberling, 255 N. Portage Path, #503, Akron, Ohio 44303

[21] Appl. No.: 860,322

[22] Filed: May 6, 1986

[51] Int. Cl.$^4$ .............................................. B29D 30/56
[52] U.S. Cl. .................................... 156/96; 156/123; 264/36
[58] Field of Search ...................... 156/96, 123, 128.1, 156/124, 128.6, 130.5, 130.7, 133, 272.2, 273.5, 273.3, 275.5; 152/532; 264/22, 36

[56] References Cited

U.S. PATENT DOCUMENTS

| | | | |
|---|---|---|---|
| 3,698,975 | 10/1972 | Hogan, Jr. | 156/96 |
| 3,933,533 | 1/1976 | Seiberling | 156/123 |
| 3,933,566 | 1/1976 | Seiberling | 156/123 X |
| 4,176,702 | 12/1979 | Seiberling | 156/96 X |
| 4,230,649 | 10/1980 | Bohm et al. | 156/96 X |
| 4,240,851 | 12/1980 | King | 156/96 |

FOREIGN PATENT DOCUMENTS 57-04756  1/1982  Japan .................................. 156/128.6

OTHER PUBLICATIONS

Lyall et al., "Electron Beam Processing", European Rubber Journal, vol. 166, No. 9, Oct. 1984, p. 21–27, 26.
Brochure, "Opportunities in Tire Retreading", by American Retreaders Association, Inc.
Brochure, "Electrocurtain ® Electron Beam Technology", by Energy Sciences, Inc.

*Primary Examiner*—Michael Ball
*Assistant Examiner*—Ramon R. Hoch
*Attorney, Agent, or Firm*—Wood, Herron & Evans

[57] ABSTRACT

An improved retreaded tire which is less expensive and lighter weight and which can be cured in less time results from the use of cushion gum layers which have been subjected to electron irradiation or other means of radiation having the same curing effect thereon.

20 Claims, 2 Drawing Sheets

METHOD FOR RETREADING TIRES

BACKGROUND OF THE INVENTION

This invention relates generally to improved processes for the retreading of pneumatic tires and to the products resulting from such improved processes. More particularly it relates to a new and improved process for treating and using the cushion gum layer used in retreading tires and more specifically the way the cushion gum layer is used to unite the tire carcass to be retreaded to the new tread and/or to unite the ends of the new tread joined together around the tire carcass.

The retreading of pneumatic tires involves the use of three basic elements—the carcass of the tire to be retreaded, the new tread material to be applied thereto and a cushion gum layer to be placed between the carcass and the new tread to assist in adhering the one to the other.

In a conventional, prior art retreading process, the tire carcass, or casing, is prepared for retreading by first inspecting the used tire carefully to determine that no damage to the carcass took place during the earlier use, then removing sufficient old rubber from the tread area to provide a uniform surface for the application of the new tread rubber, then buffing that renewed surface to assist in the adhesion process and finally, if desired, applying a layer of adhesive to the buffed surface to provide building tack in the subsequent operations as well as to assist in the adhesion process.

The new tread is sometimes prepared by extruding unvulcanized rubber, properly mixed with known ingredients to provide a satisfactory tire tread, through a die of appropriate configuration. The new tread can be used in the unvulcanized state, or, may be first cured with an appropriate tread pattern molded into one surface. The industry identifies this as a precured tread. If precured, the tread is usually buffed and, if desired, cemented before being applied to the carcass. The buffing operation is applied not only to the surface to be united with the carcass but also to the ends of the tread which are to be joined together around the tire carcass.

Another method to provide the new tread is to extrude a strip or ribbon of unvulcanized rubber directly onto the prepared tire carcass as described in U.S. Pat. No. 4,221,253.

The cushion gum layer, also sometimes described in the prior art as the bonding layer or tie gum layer, is prepared by calendering a unvulcanized rubber composition mixed with the appropriate compounding ingredients well known in the art, to provide the necessary gauge, width and length required to be used between the carcass and the tread. The width and length of this layer is determined by the size of the tire and the gauge or thickness is usually in the range of 0.060 to 0.100 inches.

A second cushion gum layer which may be, but is not necessarily the same material as that used between the carcass and the tread, is used between the ends of the tread which are joined around the carcass.

SUMMARY OF THE INVENTION

One of the objects of this invention is to reduce the time required to vulcanize the retread tire assembly. Another object is to reduce the gauge or thickness of the cushion gum layer used in retreading tires, thereby creating a cheaper, lighter weight, cooler running retreaded tire. It has also been an objective to reduce the time and energy required to produce a retreaded tire.

The objects of this invention are accomplished by partially curing the cushion gum layer, used between the carcass and the tread and between the ends of the tread, by subjecting said layer to electron radiation or other means of radiation having the same curing effect on said cushion gum layers, prior to the final assembly of the carcass, new tread and cushion gum layers. The assembled elements are then cured by any conventional means. The other means of radiation commonly referred to as ionizing radiation are taught U.S. Pat. No. 3,084,115.

DESCRIPTION OF THE DRAWINGS

Other aspects of this invention will become apparent by reference to the following description and figures in which.

DESCRIPTION OF THE PREFERRED EMBODIMENTS

Figure 1:
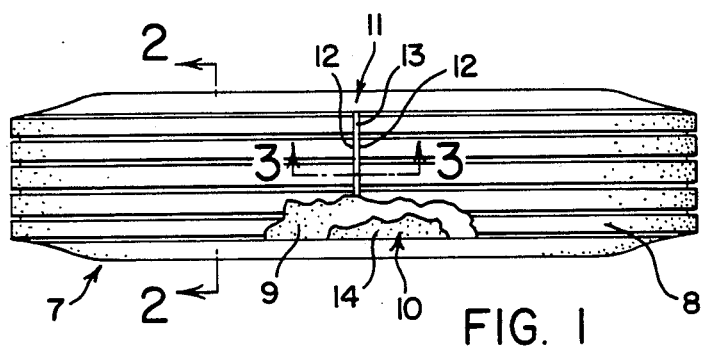
FIG. 1 is a plan view with parts of a retreaded tire showing the tread, cushion gum layer and carcass.
Figure 3:
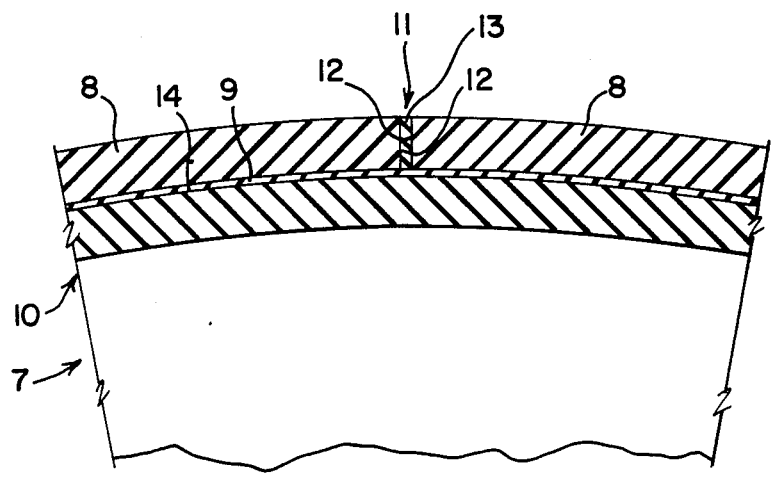
FIG. 3 is a view taken along the lines 3—3 of FIG. 1.
Figure 2:
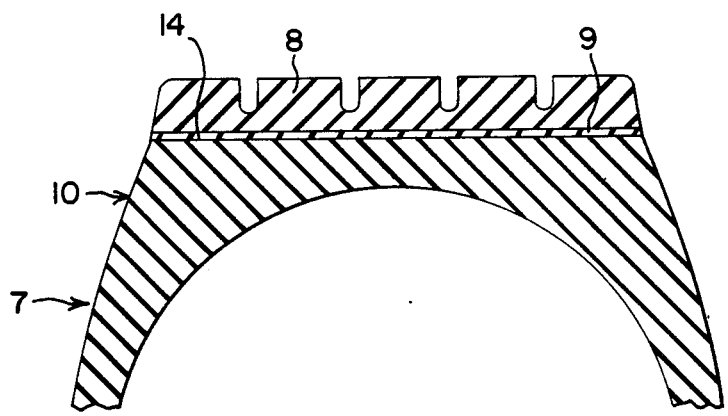
FIG. 2 is an enlarged fragmentary cross section taken on lines 2—2 of FIG. 1.
Figure 6:
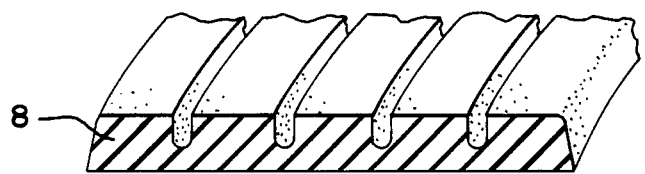
FIGS. 4, 5 and 6 are fragmentary exploded pictorial views showing the carcass, cushion gum layer and precured tread.
Figure 5:
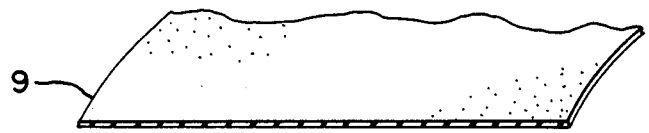
Figure 4:
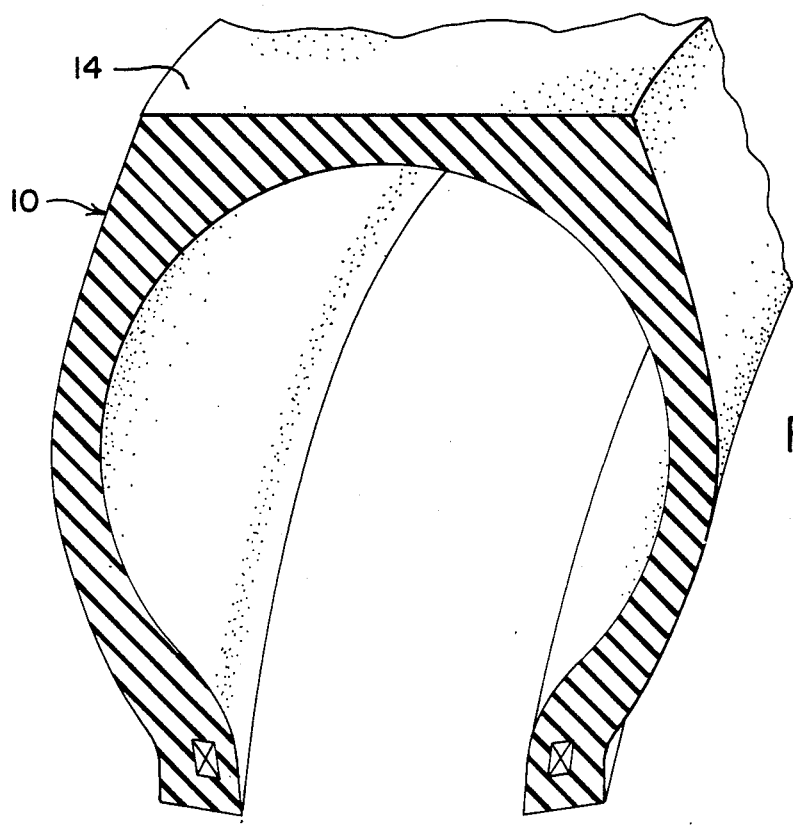

In order to understand the process of the present invention, it is helpful to understand a conventional retreading process, using a precured tread. The drawings illustrate such a process. More particularly, in a conventional retreading operation in which a precured tread 8, a cushion gum layer 9, and a carcass 10 are utilized, the previously prepared carcass 10 is mounted on a rim or other support means (not shown) which can be rotated. The carcass 10 is inflated by conventional means; an adhesive coating of conventional formula is applied to an area, i.e., the buffed area 14 which has previously been buffed by conventional means; the cushion gum layer 9 is applied to the buffed area 14 of the carcass 10; and the precured tread 8 is applied to the cushion gum layer 9. Eleven in FIG. 3 shows the joining of two ends of the precured tread. An additional cushion gum layer 13 is inserted between the ends 12, 12 of the tread 8 as it is wrapped around the carcass 10 and joined together.

With an assembly in which a precured tread is used the retreaded tire 7 is usually placed in an envelope and vulcanized. The use of an unvulcanized tread requires the use of molding means to create a tread pattern in the finished retreaded tire.

Additional information about retreading is available in a pamphlet entitled "Opportunities in Tire Retreading", available from American Retreaders, Inc., P. O. Box 17203, Louisville, Ky., 40217, incorporated by reference herein and submitted on even date herewith the Prior Art Disclosure Statement.

Electron radiation has been used in the rubber industry for several years. Equipment and techniques for treating various elements of a tire are disclosed in my issued patents U.S. Pat. Nos. 4,221,253 and 3,933,566.

The irradiation of natural rubber or synthetic rubber compositions causes the molecular structure to be rearranged and results in a partial or complete cure thereof depending upon the energy level used and the length of time of exposure. The rubber compositions which are thermoplastic when irradiated become partially or totally thermoset whether curing agents such as sulphur are present or not.

Electron radiation equipment is available at different voltage capabilities such as 300 KV up to 750 KV. With the higher voltage equipment deeper penetration of the energy waves into the rubber becomes possible. The voltage employed and the density of the material treated determines the depth of penetration of the electrons and therefore the depth to which the rubber is cured or partially cured. Suitable electron radiation equipment for the practice of the present invention may be obtained from Energy Sciences, Inc. of Wobrun, Mass. A brochure, incorporated by reference herein, describing the equipment and various process parameters has been submitted to the U.S. Patent & Trademark Office on even date herewith. Such equipment is further disclosed and described in U.S. Pat. Nos. 3,702,412, 3,769,600, 3,780,308, 3,745,396, 4,100,450 and 4,252,413. While electron irradiation is the preferred method other types of radiation may be used, so long as they have the same curing effect.

In the practice of the present invention one or more surfaces of the cushion gum layer is irradiated. The term "surface" is to be understood to include any surface of the cushion gum layer which will be adhered to the carcass or precured tread or any end of the precured tread joined around the carcass. When only one surface of the cushion gum layer is irradiated and insufficient voltages are used, complete penetration will not be achieved and the degree of cure in the layer decreases as the distance from the treated surface increases. Using a given voltage and by irradiating from both sides of the cushion gum layer, a greater thickness of rubber can be cured or partially cured and a more uniform cure or partial cure may be obtained.

The energy delivered by electron radiation to any point in the rubber layer is measured in megarads which in turn determines the level of cure at that point. Using a given energy source, the longer a layer is exposed to the radiation the greater is the number of magarads that will be delivered to the layer and therefore the greater will be the curing effect thereon.

Using equipment with as low as or lower than 300 KV capacity and as high as or higher than 750 KV capacity and adjusting the rate of exposure to provide from 2 to 10 megarads or more to the cushion gum layer will produce treated cushion gum layers useful in the practice of this invention. One or both surfaces of the cushion gum layer may be subjected to such radiation. Factors to be considered in specific cases include the thickness of the layer, the capability of the energy source, the desired level of cure, the density of the rubber to be treated and, in a continuous operation the rate at which the cushion gum layer passes through the energy source.

The current practice in retreading tires calls for cushion gum layers in the approximate thickness of 0.060 to 0.100 inches. By using electron radiation treated material in accordance with the practice of this invention it is possible to reduce the gauge of the cushion gum layer by 50% or more and still produce a retreaded tire of comparable or improved quality in terms of adhesion of tread to carcass. This reduction in gauge provides a saving in material, a lighter weight tire and a tire which will run cooler on the road because of such lighter weight. Attempts to reduce the thickness of conventional cushion gum layers would result in lack of dimensional stability and thereby adversely affect the handling of the layer during assembly and the quality of the finished product.

In addition, because the cushion gum layer has been partially cured by the radiation treatment, it is possible to complete the cure of the retread assembly in a shorter time—resulting in energy savings, increased capacity of the curing equipment while reducing the danger of overcure in the carcass of the tire.

In the practice of the present invention both surfaces of the cushion gum layer may be irradiated simultaneously by using a source of radiation to treat one surface and a second source of radiation to treat the opposite surface. Alternatively, the surfaces may be sequentially irradiated. A source of radiation may be positioned so that radiation enters a first surface of said cushion gum layer and thereby partially cures at least a portion of the cushion gum layer and a second source of radiation may be positioned so that the radiation enters the opposite surface and thereby partially cures a portion of said cushion gum layer. The objective of irradiating each surface is to obtain a degree of cure in the middle of the layer which approximates the cure close to the surface. It is known that the amount of cure decreases as the distance increases from the surface that is being treated. By treating each surface and insuring that the curing from each surface overlaps in the middle, more equal cure throughout the cushion gum layer may be obtained.

In the practice of the present invention one may use, for example a cushion gum layer of 0.025 and cure from each side with 10 megarads of irradiation from a 275 KV electron irradiation apparatus. The direct advantages of doing so include, reduction in final curing time and reduction of the amount of rubber in the cushion gum layer.

The cushion gum layer can be irradiated before or after being united to the tread or carcass.

While certain representative embodiments and details have been shown for the purpose of illustrating the invention, it will be apparent to those skilled in the art that various changes and modifications may be made therein without departing from the spirit or scope of the invention.

Having thus described my invention, I claim:

1. In the process of retreading tires which includes the steps of
    preparing the tire carcass to be retreaded;
    furnishing a precured tread; and
    furnishing a cushion gum layer to be placed between the ends of said precured tread, the improvement which comprises partially curing all or a part of said cushion gum layer by electron irradiation before assembling said carcass, precured tread and cushion gum layer.

2. The process of claim 1 wherein the improvement comprises
    (a) partially curing a portion of said cushion gum layer by radiation entering a first surface and further
    (b) partially curing at least a portion of said cushion gum layer by radiation entering the opposite surface.

3. The process of claim 1 wherein a source of said radiation is positioned so that the irradiation therefrom enters a surface of said cushion gum layer thereby partially curing at least a portion of said cushion gum layer and a source of said radiation is positioned so that the irradiation therefrom enters the opposite surface of said cushion gum layer thereby partially curing at least a portion of said cushion gum layer.

4. The process of claim 1 in which the cushion gum layer is subjected to said radiation in a continuous operation in which the cushion gum layer and the source of irradiation are moved continuously relative to one another.

5. The process of claim 2 in which the cushion gum layer is subjected to said radiation in a continuous operation in which the cushion gum layer and the source of irradiation are moved continuously relative to one another.

6. The process of retreading a tire which comprises:
   (a) preparing the carcass of the tire to be retreaded;
   (b) preparing a precured tread for use with said carcass;
   (c) preparing a cushion gum layer for use between said carcass and said precured tread;
   (d) partially curing at least a portion of said cushion gum layer by subjecting said cushion gum layer to electron irradiation;
   (e) assembling said carcass, precured tread and cushion gum layer; and
   (f) curing said assembly.

7. The process of claim 6 in which the partial curing of the cushion gum layer is achieved by subjecting one surface thereof to said radiation.

8. The process of claim 6 wherein the source of radiation is adjacent a first surface of said cushion gum layer and radiation from said source enters said first surface thereby partially curing at least a portion of said cushion gum layer and a second source of radiation is adjacent the opposite surface of said cushion gum layer and radiation from said second source enters said opposite surface thereby partially curing at least a portion of said cushion gum layer.

9. The process of claim 8 wherein an intermediate portion of said cushion gum layer between said first surface and the opposite surface is partially cured by radiation entering said first surface and also partially cured by radiation entering said opposite surface.

10. The process of claim 6 in which the assembly to be cured is prepared by laminating said partially cured cushion gum layer to the carcass and thereafter laminating the precured tread to the cushion gum layer.

11. The process of claim 1 in which the assembly to be cured is prepared by laminating said partially cured cushion gum layer to the precured tread portion and thereafter joining the resulting laminate to the carcass.

12. The process of claim 6 in which the assembly to be cured is prepared by laminating an uncured cushion gum layer to the tread portion and thereafter partially curing at least a portion of the cushion gum layer by subjection to electron irradiation and joining said laminate to the carcass.

13. The process of claim 6 in which the assembling of the carcass, precured tread and cushion gum layer is carried out so that said partially cured cushion gum layer is positioned between the precured tread and the carcass while another cushion gum layer is positioned between the ends of the precured tread joined together around said carcass.

14. The process of claim 13 in which at least a portion of both cushion gum layers is partially cured by being subjected to electron irradiation.

15. The process of retreading a tire which comprises the steps of
   (a) preparing the carcass of the tire to be retreaded;
   (b) preparing a precured tread for use with said carcass;
   (c) preparing a cushion gum layer for use between said carcass and said precured tread;
   (d) preparing a cushion gum layer for use between the ends of the precured tread;
   (e) partially curing at least a portion of each of said cushion gum layers by subjecting said layers to electron irradiation;
   (f) assembling said carcass, precured tread and cushion gum layers; and
   (g) curing said assembly.

16. The process of retreading a tire which comprises:
   (a) preparing the carcass of the tire to be retreaded;
   (b) preparing a precured tread for use with said carcass;
   (c) preparing a cushion gum layer for use between said carcass and said precured tread;
   (d) partially curing at least a portion of said cushion gum layer by subjecting said cushion gum layer to ionizing radiation;
   (e) assembling said carcass, precured tread and cushion gum layer; and
   (f) curing said assembly.

17. The process of retreading a tire which comprises the steps of
   (a) preparing the carcass of the tire to be retreaded;
   (b) preparing a precured tread for use with said carcass;
   (c) preparing a cushion gum layer for use between said carcass and said precured tread;
   (d) preparing a cushion gum layer for use between the ends of the precured tread;
   (e) partially curing at least a portion of each of said cushion gum layers by subjecting said layers to ionizing radiation;
   (f) assembling said carcass, precured tread and cushion gum layers; and
   (g) curing said assembly.

18. The process of claim 15 or 17 wherein partial curing of said cushion gum layers is achieved by subjecting a first surface and an opposite surface of said cushion gum layers to electron irradiation.

19. The process of claim 15 or 17 wherein the treatment of a first surface of a cushion gum layer and a treatment of the opposite surface of said cushion gum layer results in at least a portion of an internal portion of said cushion gum layer being partially cured by the treatment entering each surface.

20. In the process of retreading a tire which includes the steps of
   (a) preparing a carcass for retreading;
   (b) preparing a precured tread;
   (c) furnishing a cushion gum layer for use between the carcass and precured tread;
the improvement which comprises partially curing at least a portion of said cushion gum layer by exposure to electron irradiation.

21. The process of claim 6 or 16 wherein a source of said radiation is positioned so that radiation therefrom enters a surface of said cushion gum layer thereby partially curing at least a portion of said cushion gum layer and a source of said radiation is positioned so that the radiation therefrom enters the opposite surface of said cushion gum layer thereby partially curing at least a portion of said cushion gum layer.

22. The process of claim 21 wherein a portion of said cushion gum is partially cured by radiation entering opposite surfaces thereof.

23. The process of claim 22 in which the cushion gum layer is subjected to said radiation in a continuous operation in which the cushion gum layer and the source of radiation are moved continuously relative to one another.

24. The process of claim 21 in which the cushion gum layer is subjected to said radiation in a continuous operation in which the cushion gum layer and the source of irradiation are moved continuously relative to one another.

25. The process of claim 6 or 16 in which the cushion gum layer is subjected to said radiation in a continuous operation in which the cushion gum layer and the source of irradiation are moved continuously relative to one another.

* * * * *